June 9, 1964   R. G. SWANSON   3,136,653
COATING COMPOSITIONS AND METAL SUBSTRATES COATED THEREWITH
Filed Oct. 26, 1961

PRIMER COAT OF DRYING OIL MODIFIED ALKYD RESIN-EPOXY RESIN.
METAL SUBSTRATE.

TOP COAT OF SYNTHETIC RESIN ENAMAL OR ACRYLIC LACQUER.
PRIMER COAT.
METAL SUBSTRATE.

INVENTOR
RALPH GILBERT SWANSON

BY Raymond E. Blomstedt
ATTORNEY

United States Patent Office 3,136,653
Patented June 9, 1964

3,136,653
COATING COMPOSITIONS AND METAL SUBSTRATES COATED THEREWITH
Ralph Gilbert Swanson, Flint, Mich., assignor to E. I. du Pont de Nemours and Company, Wilmington, Del., a corporation of Delaware
Filed Oct. 26, 1961, Ser. No. 147,758
5 Claims. (Cl. 117—75)

This invention relates to coating compositions, more particularly to coating compositions designed for use as primers for metal substrates, still more particularly to metal substrates coated with the primer compositions and still more particularly to primed ferrous metal substrates having improved resistance to corrosion when subjected to aqueous salt spray.

Many types of film formers have been used for coating metals to form films and coatings thereon which have good durability and gloss retention. When such coatings are used on metals to be used outdoors, such as steel automobile bodies, they frequently fail due to insufficient adhesion to the metal substrate. It is common practice to apply a primer to the metal which adheres to metal to provide a surface to which the top or finish coats will adhere. The automobile sheet metal parts, and in some cases bodies, are usually primed by dip or flow coating which coats both sides of the metal parts. The prime coat provides corrosion resistance to the underneath and unexposed areas which receive no further coating. While the primers currently in use provide a satisfactory surface to which the topcoat or finish coats will adhere, there is need for further improvement in the corrosion resistance of the underneath or untopcoated surfaces of the automobile body and parts, such as the fenders, hood, etc., particularly in those geographical areas where such surfaces are exposed to aqueous salt spray, such as near the seashore and during the winter months in those areas where salt is used on roadways covered with snow and/or ice to reduce the slipping hazard.

This invention pertains to a metal primer which protects a metal substrate from corrosion when exposed to a salt spray and also provides a surface to which subsequent and intermediate surface coats will adhere. It also pertains to a metal primer which can be used as a prime coat for methyl methacrylate lacquers in conjunction with an intermediate sealer coat and other conventional topcoats, such as alkyd resin enamels, alkyd/aminoaldehyde resin enamels and nitrocellulose lacquers.

Figure 1:
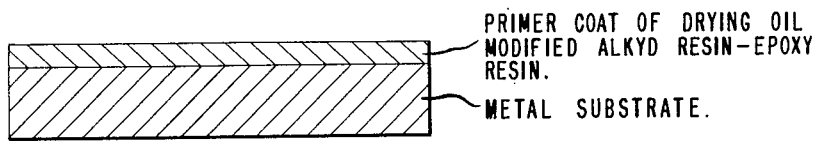
Figure 2:
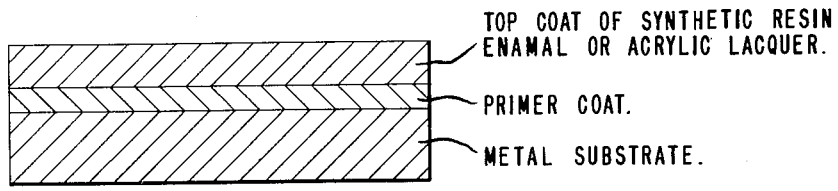

The coating system of the instant invention is depicted in FIGURES 1 and 2 of the drawing.

The objects of this invention are accomplished by a primer composition which contains as essential components a drying oil modified glyceryl phthalate alkyd resin having an acid number less than about 10 and a liquid (at room temperature) epoxy resin having an epoxy equivalent up to about 300 which is the reaction product of epichlorohydrin and diphenylol propane and having the following formula:

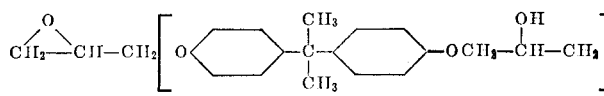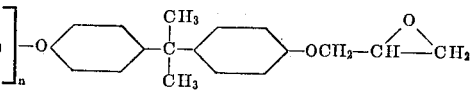

The commercial epoxy resins are mixtures of polymers where $n$ varies between 0 and 10, indicating molecular weights in the order of 400 to 8000. "Epon 828," a particularly preferred epoxy resin for use in this invention, is sold by Shell Chemical Company and has a melting point of 8–12° C. and an epoxy equivalent of 190–210. The term "epoxy equivalent" is defined as the weight of the resin in grams containing one gram equivalent weight of epoxy groups.

Other commercial liquid epoxy resins which are equivalent to the "Epon 828," for the purposes of this invention, are "DER–331," sold by Dow Corning Corporation, and "Ciba Resin 502," sold by Ciba, Ltd.

The liquid epoxy resins are first dissolved in a volatile solvent and the solution then dispersed in the primer composition. The solid epoxy resins, i.e., those having an epoxy equivalent greater than about 300, require solvents which are undesirable in the primer composition of this invention.

Any of the conventional alkyd resins used in baking type coating compositions can be used in the composition of this invention. These resins are usually prepared by heating together a polycarboxylic acid component, a polyol component, and an oil component with or without solvent at a temperature of less than about 300° C. and preferably about from 180° to 250° C. until an alkyd resin having the desired properties is obtained. Typically, such alkyd resins have an oil length of about 30 to 60%, an acid number of less than about 10, and 2% to 8% of unreacted hydroxyl. "Oil length" is a term used to describe the amount of oil in the resin and equals the percent by weight of fatty oil acid calculated as triglyceride (monocarboxylic acid-glyceride) used in preparing the resin. As is conventional in the coating art, the unreacted hydroxyl and oil length are based on glycerol whether or not glycerol is used as the polyol. The acid number is the number of milligrams of potassium hydroxide necessary to neutralize the acidity of one gram of alkyd resin.

Polycarboylic acids, such as, for example, oxalic acid, malonic acid, succinic acid, glutaric acid, sebacic acid, adipic acid, pimelic acid, suberic acid, azelaic acid, tricarbalylic acid, citric acid, tartaric acid, maleic acid, phthalic acid, terephthalic acid, itaconic acid, citraconic acid, and mixtures thereof can, among others, be used in preparing the alkyd resins employed in the invention. Of course, any of the anhydrides of the aforementioned acids can be used in equivalent amounts in place of the acids. Phthalic acid or anhydride is a preferred constituent of the polycarboxylic acid component.

Typcal polyols useful in the alkyd resin are, for example, ethylene glycol, diethylene glycol, dimethylene glycol, tetramethylene glycol, pinacol, trimethylol propane, trimethylol ethane, mannitol, sorbitol, glycerol, pentaerythritol and mixtures thereof. Glycerol is a preferred polyol.

Illustrative oil components are, for example, drying oils, such as dehydrated castor oil, tung oil, oiticica oil, linseed oil and perilla oil; semi-drying oils, such as soybean oil, menhaden oil and cod-liver oil, and olive oil; fatty acids derivable from the aforementioned oils, such as linolenic, linoleic, palmitoleic and oleic acid; and mixtures thereof. Materials such as tall oil, and tall oil fatty acids can also be used with or in place of the aforementioned oils and fatty acids. Non-drying oils should not be used as the sole constituent of the oil component since primers made therefrom do not form hard durable coatings.

It is important for the purposes of this invention that the acid number of the alkyd resin not be above about 10 in order to prevent silking and the pigments from settling in the primer composition. Further, alkyd resins having an acid number greater than about 10 tend to react with carbonate fillers, which are usually present, which releases $CO_2$ to cause gas formation in the containers and corrosion resistance of the primer coating is reduced as a result of the formation of water soluble compounds. Still further, if the acid number of the alkyd resin is appreciably above 10, there is no significant improvement in corrosion resistance to be had by the addition of the liquid epoxy resin. The amount of drying oil modification of the alkyd resin is not particularly critical, i.e., widely varying amounts of oil modification can be employed. As little as about 30% and as much as about 60% of oil based on the weight of the alkyd resin can be used.

The following table illustrates the useful range of proportions of drying oil modified alkyd resin and liquid epoxy resin in preparing the primer composition of this invention:

| | Parts by weight |
|---|---|
| Drying oil modified alkyd resin | 84 to 98.5 |
| Liquid epoxy resin | 16 to 1.5 |

The particularly preferred ratio is about 93.5 parts of drying oil modified alkyd resin to about 6.5 parts of liquid epoxy resin.

If the liquid epoxy resin is present in amounts greater than that indicated above, the primer composition is too soft and does not form a durable film. If lesser amounts are used, there is no significant improvement in corrosion resistance as determined by a standard salt spray test.

The parts and percentage figures throughout the specification and claims are expressed on a weight basis unless stated otherwise.

*Example I*

The following ingredients were added to a ball mill and ground until the composition was homogeneous:

| | Parts by weight |
|---|---|
| 50% solution of a 52.4% soya oil modified glyceryl phthalate resin dissolved in mineral spirits | 57.41 |
| Heat bodied soya oil | .65 |
| 50% solution of liquid epoxy resin ("Epon 828") in diacetone alcohol | 4.00 |
| Mineral spirits (B.R. 300–420° F.) | 11.27 |
| Inhibitor (phenyl alpha naphthylamine) | .93 |
| Calcium carbonate filler | 25.44 |
| Carbon black | 2.76 |
| Zinc chromate | 1.54 |
| | 104.00 |

After grinding the above composition about one hour, 45 parts by volume of mineral spirits are added to 100 parts by volume of the composition to reduce the viscosity to that which is suitable for dip coating.

Ten automotive steel panels 4" x 12" x .027", previously cleaned and zinc phosphate treated (Bonderite #100), were primed by dipping (submerging) them in the above described reduced composition and allowing them to drain in a vertical position for ten minutes at room temperature after which they were baked at 375° F. for thirty minutes.

For a control, ten additional steel panels of the same lot were primed in a similar manner with a priming composition which differed only from the above described primer composition in that the 50% solution of the liquid epoxy resin ("Epon 828") was omitted.

The average thickness of the dry film for the panels of Example I and the control panels was 0.39 mil and 0.61 mil. 2 inches and 10 inches, respectively, from the top of the panel.

The panels prepared in accordance with this invention (Example I) and the control panels were exposed to a salt (sodium chloride) spray test in accordance with the procedure described in ASTM B–117–57T. Five panels of each group were exposed to the salt spray test for 7 and 11 days, respectively. This test is briefly described as follows:

The primed panels to be tested along with their controls are placed in a salt spray cabinet meeting ASTM designation B–117–57T, which, among other things, calls for 5% NaCl fog at 95° F.

The panels are held in slots on a rack such that they slant 15° from vertical. The order of placement of the panels on the racks is randomized daily. The panels remain in the cabinet until the fastest corroding panel shows corrosion failure over 50% of the area of the panel. The two sets of panels are then removed from the cabinet and rated for degree of corrosion. This is usually after about seven days in salt spray.

At the end of each exposure period, the panels were examined and rated on the basis of the sprayed area which was corroded (rusted) as described in ASTM B–117–57T. The results were as follows:

| | Percent of Surface Area of Salt Sprayed Panel Corroded | |
|---|---|---|
| | Example #I | Control for Example #I |
| 7 Day Exposure to Salt Spray: | | |
| Panel #1 | 2 | 40 |
| Panel #2 | 2 | 15 |
| Panel #3 | 2 | 10 |
| Panel #4 | 3 | 50 |
| Panel #5 | 3 | 50 |
| 11 Day Exposure to Salt Spray: | | |
| Panel #6 | 10 | 80 |
| Panel #7 | 10 | 70 |
| Panel #8 | 10 | 60 |
| Panel #9 | 10 | 90 |
| Panel #10 | 15 | 80 |

The dry primed and baked sheet metals were next spray coated on one side (the side to be exposed) with an intermediate sealer based on the polymer of Example I of U.S. Patent 2,949,445.

Sufficient sealer composition was applied to deposit a dry film of about 0.3–0.5 mil thick. After allowing the sealer coat to flash dry at room temperature for about one minute, it was finished with a polymethyl methacrylate surface lacquer composition, such as described in Example I of U.S. Patent 2,860,110. The adhesion of the primer to metal substrate, the intermediate sealer to the primer, and the surface lacquer to the intermediate sealer was very satisfactory as determined by standard tests.

The heat bodied soya oil was incorporated in the above described primer to facilitate processing of the composition, i.e., inhibit settling of the pigment in commercial use. The heat bodied oil and inhibitor are not essential to the success of this invention and can be eliminated entirely.

*Example II*

Example I was repeated except the amount of the 50% solution of liquid epoxy resin in diacetone alcohol was reduced 50%, i.e. only two parts of the 50% solution were employed instead of four parts, the proportions of all other ingredients remaining the same. The milled composition was reduced to dipping viscosity by blending 100 parts by volume of the milled composition with 50 parts by volume of mineral spirits.

Ten steel test panels, prepared as in Example I, were dipped in the reduced primer composition of Example II in the same manner as described above in Example I and were allowed to drain in a vertical position for ten minutes at room temperature, followed by baking at 375° F. for 30 minutes.

For a control, ten similar steel panels were primed at the same time in a similar manner as described above with a primer composition which differed only from that described above in that the 50% solution of liquid epoxy resin in diacetone alcohol was omitted.

The average dry film thickness on the panels prepared in accordance with Example II and the control panels was 0.31 mil and 0.54 mil, 2 inches and 10 inches, respectively, from the top of the panel.

The ten panels of Example II and ten control panels were subjected to the salt spray test in accordance with the procedure in ASTM B-117-57T.

Five panels in each group were exposed to the salt spray for six days and nine days, respectively. The results were as follows:

|  | Percent of Surface Area of Sprayed Panel Corroded | |
|---|---|---|
|  | Example #I | Control for Example #II |
| 6 Day Exposure to Salt Spray: |  |  |
| Panel #1 | 6 | 20 |
| Panel #2 | 5 | 8 |
| Panel #3 | 5 | 8 |
| Panel #4 | 5 | 8 |
| Panel #5 | 10 | 40 |
| 9 Day Exposure to Salt Spray: |  |  |
| Panel #1 | 40 | 80 |
| Panel #2 | 40 | 80 |
| Panel #3 | 50 | 80 |
| Panel #4 | 50 | 80 |
| Panel #5 | 50 | 100 |

*Example III*

In order to test the effectiveness of the liquid epoxy resin for improving the resistance to salt spray corrosion of the drying oil modified alkyd resin primer applied to bonderized steel panels in the absence of the ancillary components, the following composition was prepared:

| | Parts by weight |
|---|---|
| 50% solution of a 52.4% soya oil modified glyceryl phthalate alkyd resin in mineral spirits | 100.0 |
| 50% solution of "Epon 828" liquid epoxy resin in diacetone alcohol | 4.0 |
|  | 104.0 |

The above ingredients were thoroughly mixed in a ball mill until homogeneous. The milled ingredients were reduced to a dip coating viscosity by mixing 50 parts by volume of mineral spirits with 100 parts by volume of the milled composition.

Ten steel panels similar to those employed in the preceding examples were dip coated with the above described primer composition, dried and baked as described in Example I.

Ten control panels were prepared at the same time by dip coating, drying and baking ten steel panels primed with a composition prepared by reducing 100 parts by volume of the 50% solution of the 52.4% soya oil modified glyceryl phthalate alkyd resin in mineral spirits with 50 parts by volume of mineral spirits.

The average dry film thickness on the panels of Example III and the control panels were as follows:

|  | Dry Film Thickness, mils | |
|---|---|---|
|  | Example III | Control for Example III |
| 2" from Top of Panel | .33 | .30 |
| 10" from Top of Panel | .53 | .55 |

The Example III and control panels were subjected to the salt spray (ASTM B-117-57T) test for six and nine days, respectively, and the results were as follows:

|  | Percent of Surface Area Of Sprayed Panel Corroded | |
|---|---|---|
|  | Example III | Control for Example III |
| 6 Days' exposure to Salt Spray: |  |  |
| Panel #1 | 5 | 25 |
| Panel #2 | 10 | 20 |
| Panel #3 | 5 | 25 |
| Panel #4 | 5 | 15 |
| Panel #5 | 5 | 10 |
| 9 Days' Exposure to Salt Spray: |  |  |
| Panel #1 | 10 | 50 |
| Panel #2 | 25 | 50 |
| Panel #3 | 15 | 60 |
| Panel #4 | 10 | 50 |
| Panel #5 | 10 | 20 |

*Example IV*

The following is a particularly preferred embodiment of this invention:

| | Parts by weight |
|---|---|
| A 50% solution of a 52.4% soya oil modified glyceryl phthalate alkyd resin in mineral spirits | 53.33 |
| A 50% solution of liquid epoxy resin ("Epon 828") in diacetone alcohol | 3.76 |
| Mineral spirits (B.P. range 300° F. to 400° F.) | 14.24 |
| Inhibitor (phenyl alpha naphthylamine) | .87 |
| Calcium carbonate filler | 23.78 |
| Carbon black | 2.58 |
| Zinc chromate | 1.44 |
|  | 100.00 |

The above composition is ground in a ball mill until it is homogeneous and then 45 parts by volume of a 10/90 mixture of slow evaporating solvent (such as Shell E-407 or Western Solvent Chemical Company's SC-490) and mineral spirits are added for each 100 parts by volume of the above described composition to reduce the viscosity to dip coating consistency.

A control composition for Example IV was prepared in the same manner with the same ingredients in the same proportion except the 50% solution of the liquid epoxy resin in diacetone alcohol was omitted. The control composition was reduced with the same 10/90 solvent mixture in the same amount.

Three bonderized steel panels (same as preceding examples) were dip coated in the primer composition of Example IV and three similar panels were dip coated in the control composition for Example IV. All six panels were dipped, dried and baked in the same manner as described in Example I, except the baking schedule was 20 minutes at 400° F. instead of 30 minutes at 375° F. All six panels were subjected to the same salt spray test referred to in the preceding examples for a period of ten days. The results were as follows:

|  | Example IV | Control for Example IV |
|---|---|---|
| Percent of Surface Area of Primed Panel after 10 days' Exposure to Salt Spray Test (Avg. of 3 Panels) | 10 | 80 |
| Dry Film Thickness, mils: |  |  |
| 2" from top of Panel | .31 | .31 |
| 10" from top of Panel | .47 | .47 |

Example V

The following composition was thoroughly mixed by ball milling about one hour:

| | Parts by weight |
|---|---|
| A 50% solution of a 52.4% soya oil modified glyceryl phthalate alkyd resin in mineral spirits | 52.78 |
| A 50% solution of liquid epoxy resin ("Epon 828") in diacetone alcohol | 4.00 |
| Inhibitor (phenyl alpha naphthylamine) | .96 |
| Dispersing agent (Nuosperse 657) | .42 |
| Aromatic hydrocarbon solvent (B.R. 175–233° C.) | 13.95 |
| Iron napthenate | .10 |
| Carbon black | 2.66 |
| Zinc chromate | 1.51 |
| Aluminum silicate | 23.62 |
| | 100.00 |

One hundred volumes of the above composition were reduced with 50 volumes of mineral spirits to provide a viscosity suitable for dip coating.

A control composition was prepared at the same time which differed from that of Example V in that the 50% solution of the epoxy resin was omitted, all other ingredients and proportions remaining the same.

Ten test panels (same as Example I) were dip coated in the primer composition of Example V and ten panels were dip coated in the control composition for Example V. All twenty panels were dipped, dried and baked in the same manner as described in Example I. The thickness of the dry film on the Example V panels as well as controls was about .31 mil and .51 mil 2″ and 10″, respectively, from the top of the panels.

All twenty panels were subjected to the same salt spray test as the preceding examples with the following results:

| | Percent of Surface Area of Sprayed Panel Corroded | |
|---|---|---|
| | Example V | Control for Example V |
| 5 Days' Exposure to Salt Spray: | | |
| Panel #1 | 5 | 60 |
| Panel #2 | 5 | 60 |
| Panel #3 | 3 | 70 |
| Panel #4 | 3 | 70 |
| Panel #5 | 2 | 70 |
| 6 Days' Exposure to Salt Spray: | | |
| Panel #1 | 15 | 70 |
| Panel #2 | 15 | 80 |
| Panel #3 | 15 | 80 |
| Panel #4 | 10 | 80 |
| Panel #5 | 15 | 80 |

I claim:

1. A corrosion resistant primer composition consisting essentially of about 84 parts to 98.5 parts by weight of a drying oil modified alkyl resin having an acid number less than about 10, and about 16 parts to 1.5 parts by weight of a liquid epoxy resin having an epoxy equivalent up to about 300.

2. A metal substrate primed with the composition of claim 1.

3. A ferrous metal substrate primed with the composition of claim 1 and surfaced with a synthetic resin enamel.

4. A ferrous metal substrate primed on both sides with the composition of claim 1 and surface coated on one side with an acrylic lacquer composition.

5. A liquid corrosion resistant primer coating composition consisting essentially of about 84 parts to 98.5 parts by weight of a soya oil modified alkyd resin having an acid number less than about 10, 16 parts to 1.5 parts by weight of the liquid condensation product of epichlorohydrin and diphenylol propane, said condensation product having an epoxy equivalent less than about 300, and sufficient volatile solvent to provide a viscosity suitable for dip coating.

References Cited in the file of this patent

UNITED STATES PATENTS

| 2,591,539 | Greenlee | Apr. 1, 1952 |
| 2,887,459 | Carmody | May 19, 1959 |
| 3,008,847 | La Berge | Nov. 14, 1961 |
| 3,096,203 | Levin | July 2, 1963 |